J. W. Wheeler,
Windlass Water Elevator,
Nº 34,398. Patented Feb. 11, 1862.
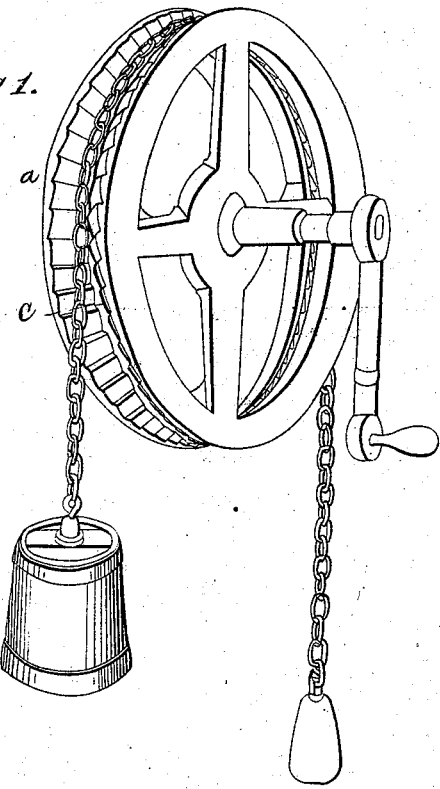
Fig 1.
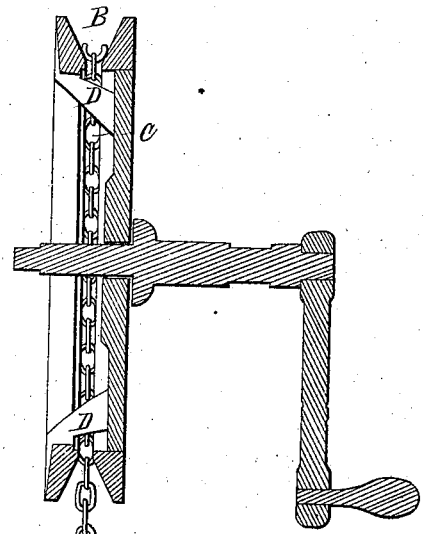
Fig 2.
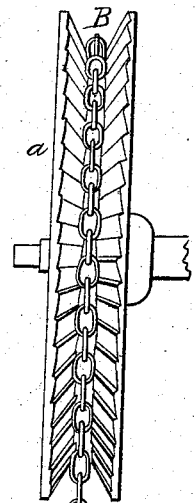
Fig 3.
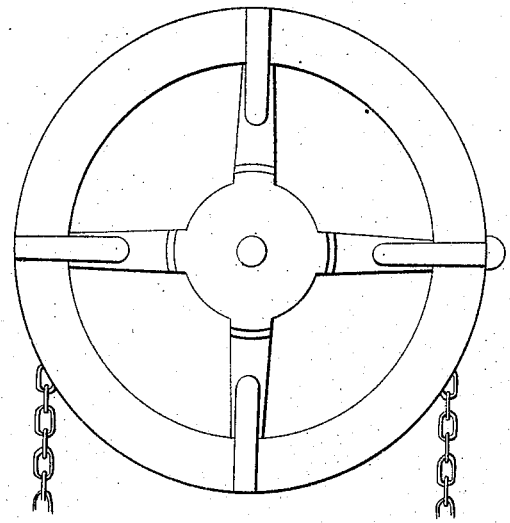
Fig 4.
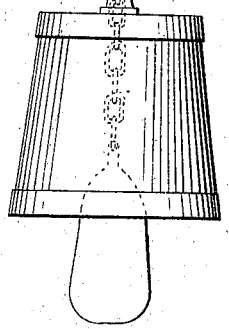
Witnesses.
Joseph W Briggs
M A Brown
Inventor.
J. W. Wheeler

UNITED STATES PATENT OFFICE.

JOHN W. WHEELER, OF CLEVELAND, OHIO, ASSIGNOR TO HENRY H. WHEELER, OF SAME PLACE.

IMPROVEMENT IN WATER-ELEVATORS.

Specification forming part of Letters Patent No. 34,398, dated February 11, 1862.

*To all whom it may concern:*

Be it known that I, JOHN W. WHEELER, of Cleveland, county of Cuyahoga, and State of Ohio, have invented a new and Improved Mode of Constructing Wheels for Elevating Water from Wells and Cisterns; and I do hereby declare that the following is a full and exact description thereof, reference being had to the accompanying drawings and letters of reference marked thereon, like letters referring to like parts.

The nature of my invention consists in the construction of a wheel on which either a chain or rope may be used, and so that neither snow nor ice will cause the chain or rope to slip on the wheel. I prevent the chain or rope from slipping by forming the cavity of my wheel in which the chain or rope rests in a V shape, with grooves formed in a zigzag shape on the sides that form the V, and with an opening in the wheel under the chain or rope which prevents snow or ice from remaining on the wheel under the chain or rope, as the snow or ice is broken from the uneven surface on the sides and is pressed through the opening formed in the wheel and under the chain or rope.

To enable others skilled in the art to make and use my invention, I will proceed to describe its construction and operation.

Figure 1 is a perspective view of the wheel with the chain weight, bucket, shaft, and handle attached. Fig. 2 is a transverse view. Fig. 3 is a front view. Fig. 4 is a side view.

A, Figs. 1 and 3, represent the grooves formed on the sides of the wheel, making a zigzag surface for the chain or rope to work in, the links of the chain resting in the grooves, said grooves forming a shoulder for the links of the chain to rest against.

B, Figs. 2 and 3, is a V-shaped cavity in which the chain or rope takes its position on the wheel. C, Fig. 2, is an opening formed in the wheel under the chain or rope, and is also seen in Figs. 1 and 3. This opening prevents the cavity B from being filled with ice in frosty weather and thereby prevents the chain or rope from slipping.

The wheel, as I construct it, may be used for other purposes besides elevating water from wells and cisterns, and when constructed, as herein described, will carry a chain more evenly and much stiller than a wheel constructed with arms and forks for the chain to work in.

What I claim, and desire to secure by Letters Patent, is—

A wheel or pulley having a V-shaped channel upon its periphery to receive the chain or rope, the inclined sides A of said channel being corrugated laterally and the bottom C open, as and for the purpose described.

JOHN W. WHEELER.

Witnesses:
 JOSEPH W. BIGGS,
 K. SMITH.